US012755456B2

(12) United States Patent
Zhang et al.

(10) Patent No.: US 12,755,456 B2
(45) Date of Patent: Oct. 6, 2026

(54) METHOD, APPARATUS, DEVICE AND STORAGE MEDIUM FOR GENERATING ANIMAL FIGURES

(71) Applicant: Beijing Zitiao Network Technology Co., Ltd., Haidian District (CN)

(72) Inventors: Peng Zhang, Beijing (CN); Qian He, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 161 days.

(21) Appl. No.: 18/569,575

(22) PCT Filed: Sep. 14, 2022

(86) PCT No.: PCT/CN2022/118623

§ 371 (c)(1),
(2) Date: Dec. 12, 2023

(87) PCT Pub. No.: WO2023/051238

PCT Pub. Date: Apr. 6, 2023

(65) Prior Publication Data

US 2024/0282027 A1 Aug. 22, 2024

(30) Foreign Application Priority Data

Sep. 29, 2021 (CN) .......................... 202111152039.1

(51) Int. Cl.
*G06T 11/60* (2026.01)
*G06V 10/774* (2022.01)
(Continued)

(52) U.S. Cl.
CPC ............ *G06T 11/60* (2013.01); *G06V 10/774* (2022.01); *G06V 10/776* (2022.01); *G06V 10/806* (2022.01)

(58) Field of Classification Search
CPC ...................................................... G06T 11/60
(Continued)

(56) References Cited

U.S. PATENT DOCUMENTS

2022/0323855 A1* 10/2022 Khare ..................... A63F 13/67

FOREIGN PATENT DOCUMENTS

CN 110009018 A 7/2019
CN 111709461 A 9/2020
(Continued)

OTHER PUBLICATIONS

Kim et al., "Polymorphic-GAN: Generating Aligned Samples across Multiple Domains with Learned Morph Maps", Jun. 6, 2022, pp. 10630-10640 (Year: 2022).*
(Continued)

*Primary Examiner* — Thomas J Lett
(74) *Attorney, Agent, or Firm* — Alleman Hall LLP

(57) ABSTRACT

Embodiments of the present disclosure discloses a method, apparatus, device and storage medium for generating an animal figure. The method comprises: obtaining, based on an animal figure generation model, at least two animal figure images and at least two sets of figure feature information respectively corresponding to the at least two animal figure images; integrating the at least two sets of figure feature information to obtain mixed figure feature information; inputting predetermined attribute information into a predetermined coder to obtain an attribute code; and inputting the mixed figure feature information and the attribute code into the animal figure generation model to obtain a target animal figure image and target figure feature information.

20 Claims, 2 Drawing Sheets

(51) Int. Cl.
*G06V 10/776* (2022.01)
*G06V 10/80* (2022.01)

(58) Field of Classification Search
USPC .......................................................... 345/581
See application file for complete search history.

(56) References Cited

FOREIGN PATENT DOCUMENTS

| | | | |
|---|---|---|---|
| CN | 112330534 | A | 2/2021 |
| CN | 112785669 | A | 5/2021 |
| CN | 112785670 | A | 5/2021 |
| CN | 112785681 | A | 5/2021 |
| CN | 113096055 | A | 7/2021 |
| CN | 113327191 | A | 8/2021 |
| CN | 113362263 | A | 9/2021 |
| CN | 113850890 | A | 12/2021 |
| EP | 3754548 | A1 | 12/2020 |
| JP | 2014106955 | A | 6/2014 |
| WO | 2014018730 | A1 | 1/2014 |
| WO | 2020258668 | A1 | 12/2020 |

OTHER PUBLICATIONS

Epstein et al., Interpolating GANs to Scaffold Autotelic Creativity, Jul. 21, 2020, MIT Media Lab, 5 pages (Year: 2020).*
Notice of Grant of Invention Patent Right for chinese patent application 202111152039.1 , Apr. 17, 2025, 8 pages.
Second Office Action for Chinese Application No. 202111152039.1, mailed Feb. 8, 2025, 12 Pages.
China National Intellectual Property Administration, Office Action and Search Report Issued in Application No. 202111152039.1, Sep. 14, 2024, 17 pages.

* cited by examiner

METHOD, APPARATUS, DEVICE AND STORAGE MEDIUM FOR GENERATING ANIMAL FIGURES

CROSS-REFERENCE TO RELATED APPLICATION(S)

The present application is a national stage of the International application PCT/CN2022/118623, filed on Sep. 14, 2022. This International application claims priority to Chinese Patent Application No. 202111152039.1, filed on Sep. 29, 2021. All of these applications are hereby incorporated by reference in their entireties.

FIELD

Embodiments of the present disclosure relates to the field of image processing, for example, to a method, apparatus, device and storage medium for generating an animal figure.

BACKGROUND

With the development of technology, more and more applications, such as short video application (app), and photo editing apps such as ULike, Xingtu etc., have been widely used, enriching users' spare time.

At present, some users like to upload photos of small animals (such as cats and dogs) or use them as profile pictures. By transforming the animal figures, they can obtain their favorite animal figures. However, the types of animal figure transformation in video interactive applications in related technologies are still limited and cannot meet users' personalized image transformation needs.

SUMMARY

Embodiments of the present disclosure provides a method, apparatus, device and storage medium for generating an animal figure. The user can animal figure according to personalized need, improving the user experience.

In a first embodiment, embodiments of the present disclosure provide a method of generating an animal figure, comprising: obtaining, based on an animal figure generation model, at least two animal figure images and at least two sets of figure feature information respectively corresponding to the at least two animal figure images; integrating the at least two sets of figure feature information to obtain mixed figure feature information; inputting predetermined attribute information into a predetermined coder to obtain an attribute code; and inputting the mixed figure feature information and the attribute code into the animal figure generation model to obtain a target animal figure image and target figure feature information.

In a second aspect, embodiments of the present disclosure provide an apparatus for generating an animal figure, comprising: an animal figure obtaining module configured to obtain, based on an animal figure generation model, at least two animal figure images and at least two sets of figure feature information respectively corresponding to the at least two animal figure images; a mixed figure feature information obtaining module configured to integrate the at least two sets of figure feature information to obtain mixed figure feature information; an attribute coding module configured to input predetermined attribute information into a predetermined coder to obtain an attribute code; and a target animal figure image obtaining module configured to input the mixed figure feature information and the attribute code into the animal figure generation model to obtain a target animal figure image and target figure feature information.

In a third aspect, embodiments of the present disclosure provide an electronic device, comprising: one or more processing devices; a storage configured to store one or more programs. the one or more programs, when executed by the one or more processing devices, causing the one or more processing devices to implement the method for generating an animal figure as described in embodiments of the present disclosure.

In a fourth aspect, embodiments of the present disclosure disclose a computer-readable medium having a computer program stored thereon, the computer program, when executed by a processing device, implementing a method for generating an animal figure as described in the embodiments of the present disclosure.

DETAILED DESCRIPTION

It should be understood that multiple steps described in the method implementation method of this disclosure can be executed in different orders and/or in parallel. In addition, the method implementation method can include additional steps and/or omit the steps shown. The scope of this disclosure is not limited in this regard.

The term "including" and its variations used in this article are open-ended, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different devices, modules, or units, and are not used to limit the order or interdependence of the functions performed by these devices, modules, or units.

It should be noted that the modifications of "one" and "multiple" mentioned in this disclosure are illustrative and not restrictive. Those skilled in the art should understand that unless otherwise specified in the context, they should be understood as "one or more".

The names of the messages or information exchanged between multiple devices in this public implementation are for illustrative purposes only and are not intended to limit the scope of these messages or information.

Figure 1:
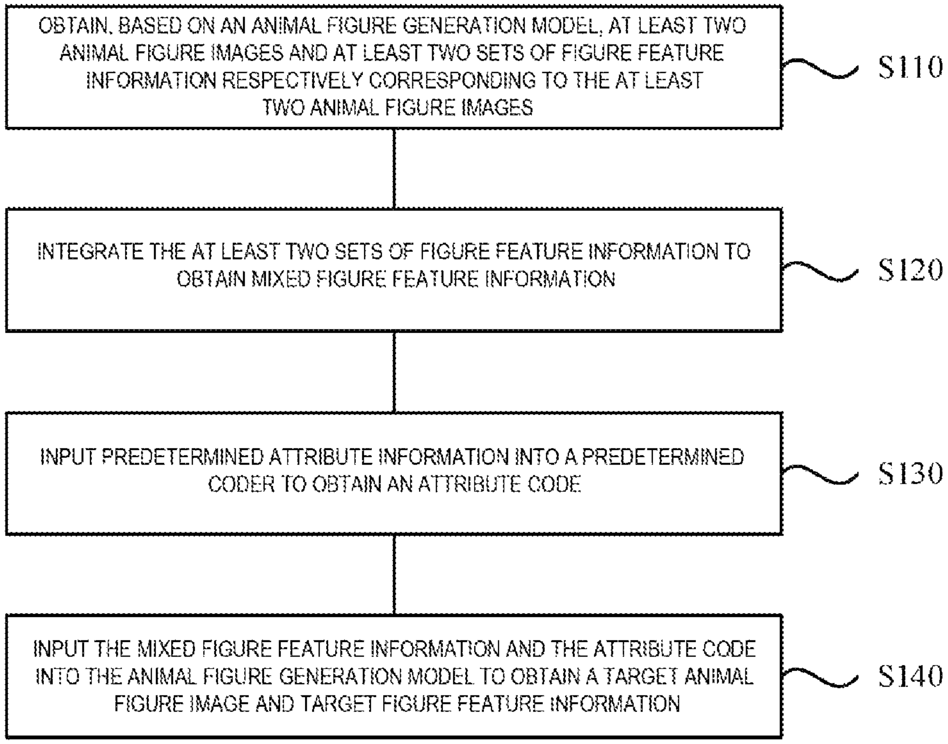
FIG. 1 is an embodiment of the present disclosure is a flowchart of a method of generating an animal figures.

FIG. 1 is a flowchart of a method for generating animal figures provided by the present disclosure. Embodiments of the present disclosure can be applied to deform the animal figure according to the user's personalized need. The method can be performed by an apparatus for generating animal figures. The apparatus can be implemented by hardware and/or software and can generally be integrated into a device with a function of deforming animal figures. The apparatus can be an electronic device such as a server, a mobile end point, or a server cluster. As shown in FIG. 1, the method comprises the following steps:

Step 110, obtain, based on an animal figure generation model, at least two animal figure images and at least two sets of figure feature information respectively corresponding to the at least two animal figure images.

The animal figure generation model can be understood as a neural network model with a function of generating animal figures.

The figure feature information can be understood as coding charactering features of the animal figure images. In this embodiment, a variety of animal figure features can be coded, i.e., quantified. For example, the figure feature can be represented by matrix or vectors.

For example, at least two sets of figure feature information are input to the animal figure generation model. According to the figure feature information, the animal figure generation model generates at least two images of the animal figure and at least two sets of figure feature information corresponding to the animal figure.

The figure feature information input to the animal figure generation model may be a random figure feature coding or feature information output from the animal figure generation model.

The random feature coding can be understood as the feature coding generated by the computer according to the predetermined randomized algorithm. Inputting the figure feature information output by the animal figure generation model into the animal figure generation model again can achieve multi-generational integration of animal figures.

In this embodiment, the animal figure generation model may be obtained based on Generative Adversarial Model Training. The animal figure generation model corresponds to the generation model in the Generative Adversarial Model.

For example, the animal figure generation model can be trained by applying a crossed iterative training on a generation model and a discriminant model until an accuracy of a discriminant result output by the discriminant model meets a predetermined condition, the trained generation model determined as the animal figure generation model.

In this embodiment, the crossed iterative training of the generation model and the discriminant model can be done by inputting random noise to obtain discriminant results; training the generation model according to the discriminant results while maintaining the parameters of the discriminant model unchanged; and adjusting the parameters of the generation model. This is repeated until the accuracy of the discriminant results output by the discriminant model meets the predetermined conditions, and the trained generation model is determined as an animal figure generation model.

The process of the crossed iterative training is as below.

a1) inputting first random noise data into the generation model to obtain first animal figure data; inputting the first animal figure data and first animal figure sample data into the discriminant model to obtain a first discriminant result; adjusting a parameter(s) of the generation model based on the first discrimination result.

The animal figure sample data can be specifically understood as animal figure images with real animal figure features which can be obtained by collecting images taken for animals from the Internet. The animal figure sample data involved in the animal figure generation model can be for different types of animals or for different breeds of a same type. As such, it is possible to respectively train a plurality of animal figure generation model. The animal figure output data may include animal figure images and figure feature information corresponding to the animal figures.

For example, the first random noise data is input to the generation model to obtain a first animal figure data. The first animal figure data and the first animal figure sample data are input into the discriminant model. According to the discriminant result, a plurality of parameters in the initial generation model are adjusted so that the animal figure output data better matches the input animal figure sample data, thereby obtaining a more accurate animal figure generation model.

By way of example, the discriminant result can be expressed in the degree of simulation. The higher the degree of simulation, the more accurate the generation model; the lower the degree of simulation, the less accurate the generation model.

b1) inputting second random noise data into the adjusted generation model to obtain second animal figure data; inputting the second animal figure data and second animal figure sample into the discriminant model to obtain a second discriminant result, and determining a real discriminant result between the second animal figure data and the second animal figure sample; and adjusting the parameter(s) in the discriminant model according to a loss function of the second discriminant result and the real discriminant result.

Herein, the discriminant model can be understood as a discriminant model in a generative adversarial network, which is adversarial trained with a generation model.

The loss function is obtained by comparing the second discriminant result obtained by the discriminant model with the real discriminant result. The plurality of parameters of the discriminant model are adjusted according to the loss function so that the discriminant model is more accurate.

For example, a smaller loss function may indicate a more accurate discriminant model.

Step 120, integrate the at least two sets of figure feature information to obtain mixed figure feature information.

For example, a weighted sum of the at least two sets of figure feature information can be obtained according to predetermined weights, to obtain mixed figure feature information.

The predetermined weights can be set by the user. For example, assuming that there are currently three sets of figure feature information, namely, e1, e2 and e3, the weights set by the user are 0.5, 0.2 and 0.3. Then the mixed figure feature information can be determined as e=0.5*e1+0.2*e2+0.3*e3. In this embodiment, the weights can represent the proportion of the sets of figure features in the mixed figure feature.

Step 130, input predetermined attribute information into a predetermined coder to obtain an attribute code.

Here the attribute information can be understood as information characterizing the animal figure feature. The attribute information includes at least one of age, hair color, figure angle and breed. Predetermined attribute information may be set according to a user's need. The coder has a function of editing the attribute information into a digital code, i.e., a function of quantizing the attribute information. In this embodiment, the coder may be a neural network having a coding function.

For example, according to the user request, the predetermined attribute information is input to the predetermined coder, and the coder compiles and converts the predetermined attribute information to obtain the attribute code. Here, the attribute code can be represented in the form of a matrix. For example, assuming that the predetermined attribute information is 10 years old, the age of 10 years old is input to the coder, and the coder outputs the coded information corresponding to the age of 10 years old.

In this embodiment, the coder can be trained in the following way:

a2) Input the real attribute information into the initial coder to obtain an initial attribute code.

For example, if the real attribute information of an animal is input into the initial coder, the initial coder will code the input real attribute based on the stored rules to obtain the initial attribute code.

b2) Input the initial attribute code and predetermined animal figure feature information into the trained animal figure generation model to obtain trained animal figure image and trained figure feature information.

For example, the initial attribute code characterizes the attribute information of the animal, and the predetermined animal figure feature information characterizes the animal figure image feature. By inputting the initial attribute code and the predetermined animal figure feature information into the trained animal figure generation model, the trained animal figure image and the trained figure feature information can be obtained. Here, the animal figure in the trained animal figure image carries the attribute feature in the real initial attribute code.

c2) Determine the coded attribute information based on the trained animal figure image.

After obtaining the trained animal figure image, the trained animal figure image is recognized to obtain the attribute information of the trained animal figure image, that is, the coded attribute information.

For example, in order to determine the coded attribute information based on the trained animal figure image, the trained animal figure image can be input into a predetermined attribute recognition model to obtain the coded attribute information.

Here the attribute recognition model has the functions of identifying and coded attribute information.

d2) Train the initial coder according to a loss function of the real attribute information and the coded attribute information to obtain the trained coder.

Here the loss function may also be a cost function which can be understood as a function representing a difference between the real attribute information and the coded attribute information.

For example, the loss function of the real attribute information and the coded attribute information can be computed. A plurality of parameters of the initial coder can be adjusted according to the loss function until the loss function satisfies a predetermined condition, thereby completing the training of the coder.

Step 140, input the mixed figure feature information and attribute code to animal figure generation model, to obtain the target animal figure image and the target figure feature information.

Here the target animal figure image refers to an animal figure image obtained by mixing and deforming at least two animal figure images. Accordingly, the target figure feature information is the figure feature information corresponding to the obtained animal figure image.

For example, the mixed figure feature information characterizes the features of the animal figure image, and the attribute code characterizes the animal figure attribute information. They are input into the animal figure generation model to obtain the target animal figure image and the target figure feature information.

Figure 2:
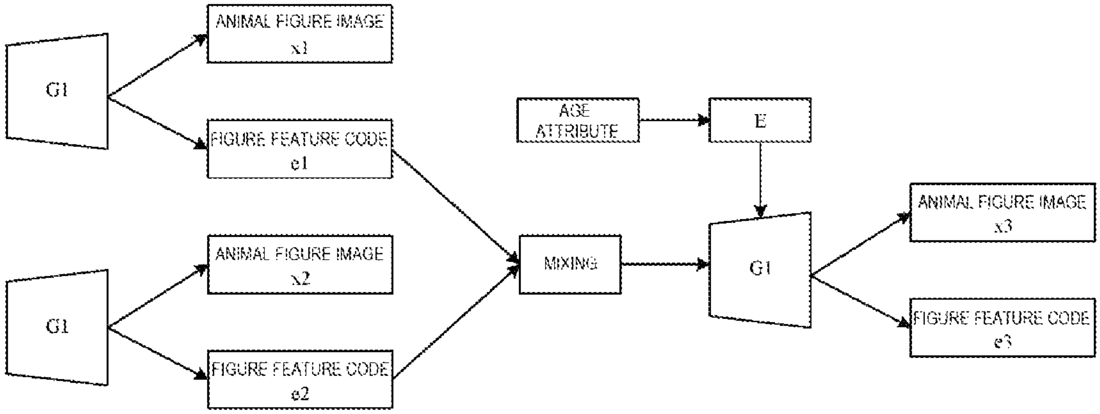
FIG. 2 is an example embodiment of the present disclosure for generating animal figures.

In order to more clearly describe embodiments of the present disclosure, FIG. 2 shows an example diagram of generating an animal figure in the embodiments of the present disclosure. For example, as shown in FIG. 2, the animal figure generation model is represented by G1, and the coder is represented by E. The specific process of generating an animal figure can be expressed as follows: obtaining, based on the animal figure generation model G1, an animal figure image x1, an animal figure image x2, the figure feature information e1 corresponding to the animal figure image x1, and the figure feature information e2 corresponding to the animal figure image x2; integrating the figure feature information e1 and e2 to obtain mixed figure feature information; obtaining the attribute code by editing the age attribute and input it into the predetermined coder E; inputting the mixed figure feature information and the attribute code into the animal figure generation model G1 to obtain the target animal figure image x3 and the target figure feature information e3.

Embodiments of the present disclosure discloses a method, device, device, and storage medium for generating an animal figure. The method comprises: obtaining, based on an animal figure generation model, at least two animal figure images and at least two sets of figure feature information respectively corresponding to the at least two animal figure images; integrating the at least two sets of figure feature information to obtain mixed figure feature information; inputting predetermined attribute information into a predetermined coder to obtain an attribute code; and inputting the mixed figure feature information and the attribute code into the animal figure generation model to obtain a target animal figure image and target figure feature information. According to embodiments of the present disclosure, the method for generating an animal figure mixed figure feature information and attribute code are input into an animal figure generation model to obtain a target animal figure image and target figure feature information, which can generate an animal figure personalized to the user and improve the user experience.

Figure 3:
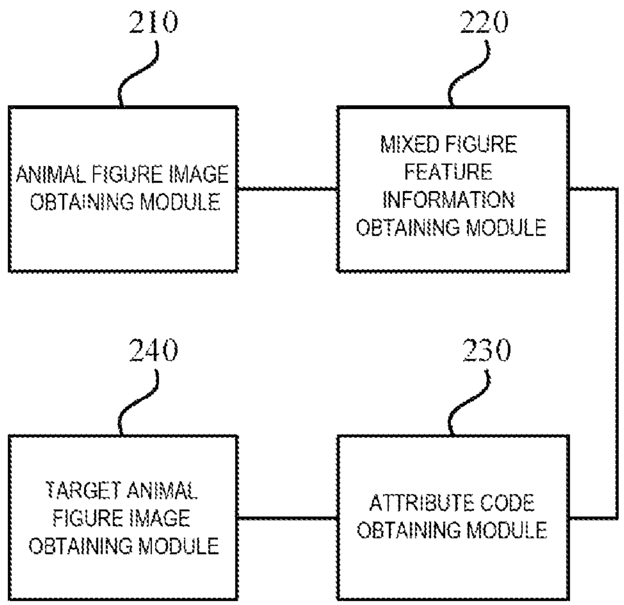
FIG. 3 is a schematic embodiment of the present disclosure of an apparatus for generating animal figures.

FIG. 3 is a schematic structural embodiment of the present disclosure of an apparatus for generating animal figure. As shown, the apparatus includes: an animal figure image obtaining module 210 configured to obtain, based on an animal figure generation model, at least two animal figure images and at least two sets of figure feature information respectively corresponding to the at least two animal figure images; a mixed figure feature information obtaining module 220 configured to integrate the at least two sets of figure feature information to obtain mixed figure feature information; an attribute coding module 230 configured to input predetermined attribute information into a predetermined coder to obtain an attribute code; and a target animal figure image obtaining module 240 configured to input the mixed figure feature information and the attribute code into the animal figure generation model to obtain a target animal figure image and target figure feature information.

For example, the animal figure image obtaining module 210 is also configured to input random feature code or figure feature information output by the animal figure generation model into the animal figure generation model to obtain the at least two animal figure images and at least two sets of figure feature information respectively corresponding to the at least two animal figure images.

For example, the mixed figure feature information module 220 is also configured to perform a weighted summation operation of the at least two sets of figure feature information according to predetermined weights to obtain the mixed figure feature information.

For example, the apparatus also includes a module for the animal figure generation model, configured to apply a crossed iterative training on a generation model and a discriminant model until an accuracy of a discriminant result output by the discriminant model meets a predetermined condition, the trained generation model determined as the animal figure generation model.

Here the process of crossed iterative training comprises: inputting first random noise data into the generation model to obtain first animal figure data; inputting the first animal figure data and first animal figure sample data into the discriminant model to obtain a first discriminant result; adjusting a parameter of the generation model based on the first discrimination result; inputting second random noise data into the adjusted generation model to obtain second animal figure data; inputting the second animal figure data and second animal figure sample into the discriminant model to obtain a second discriminant result, and determining a real discriminant result between the second animal figure data and the second animal figure sample; and adjusting the parameter in the discriminant model according to a loss function of the second discriminant result and the real discriminant result.

For example, the apparatus also includes a training module of the coder, comprising: an initial attribute coding obtaining unit configured to input real attribute information into an initial coder to obtain an initial attribute code; a trained animal figure image obtaining unit configured to input the initial attribute code and predetermined animal figure feature information into the animal figure generation model to obtain a trained animal figure image; a coded attribute information determination unit configured to determine the coded attribute information based on the trained animal figure image; a coder obtaining unit configured to train the initial coder according to a loss function of the real attribute information and the coded attribute information to obtain a trained coder as the predetermined coder.

For example, the coded attribute information determination unit is also configured to input the trained animal figure image into a predetermined attribute recognition model to obtain the coded attribute information.

For example, attribute information includes at least one of: age, hair color, figure angle, or breed.

The apparatus can perform the method of the present disclosure provided in all the foregoing embodiments, the method comprises performing the corresponding functional modules and beneficial effects. Technical details not described in detail in the present embodiment, the present disclosure may refer to the method provided in all the foregoing embodiments.

Figure 4:
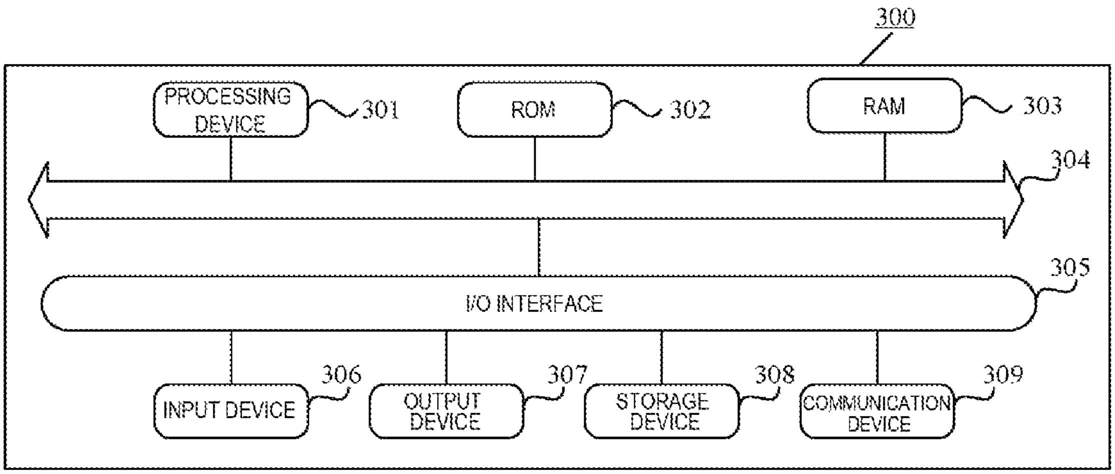
FIG. 4 is a schematic structural embodiment of the present disclosure in an electronic device.

FIG. 4 shows a schematic structural diagram of an electronic device 300 suitable for implementing embodiments of the present disclosure. The electronic device in embodiments of the present disclosure may include, but are not limited to, mobile end points such as mobile phones, laptops, digital broadcast receivers, PDAs (personal digital assistants), PADs (tablets), PMPs (portable multimedia players), car end points (such as car navigation end points), and fixed end points such as digital TVs, desktop computers, etc., or various forms of servers such as stand-alone servers or server clusters. The electronic device shown in FIG. 4 is merely an example and should not bring any limitation to the functionality and scope of use of embodiments of the present disclosure.

As shown in FIG. 4, the electronic device 300 may include a processing device (such as a Central Processor, graphics processing unit, etc.) 301, which can perform various appropriate actions and processes based on programs stored in a read-only storage device (ROM) 302 or loaded from storage device 305 into a random access storage device (RAM) 303. In RAM 303, various programs and data required for the operation of the electronic device 300 are also stored. Processing devices 301, ROM 302, and RAM 303 are connected to each other through bus 304. Input/output (I/O) interface 305 is also connected to bus 304.

Typically, the following devices can be connected to I/O interface 305: input devices 306 including touch screens, touchpads, keyboards, mice, cameras, microphones, accelerometers, gyroscopes, etc.; output devices 307 including liquid crystal displays (LCDs), speakers, vibrators, etc.; storage devices 308 including magnetic tapes, hard disks, etc.; and communication devices 309. Communication devices 309 can allow electronic devices 300 to communicate wirelessly or wirelessly with other devices to exchange data. Although FIG. 4 shows an electronic device 300 with a plurality of devices, it should be understood that it is not required to implement or have all of the devices shown. More or fewer devices can be implemented or provided alternatively.

According to embodiments of the present disclosure, the process described above with reference to the flowchart can be implemented as a computer software program. For example, embodiments of the present disclosure include a computer program product that includes a computer program carried on a computer-readable medium, the computer program containing program code for performing the recommended method of words. In such embodiments, the computer program can be downloaded and installed from the network through the communication device 309, or from the storage device 305, or from the ROM 302. When the computer program is executed by the processing device 301, the above-described functions defined in the embodiments of the present disclosure are performed. The computer-readable storage medium can be a non-transitory computer-readable storage medium.

It should be noted that the computer-readable medium described above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device, or any combination thereof. More specific examples of computer-readable storage media can include but are not limited to: an electrical connection with one or more wires, a portable computer disk, a hard disk, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination thereof. In this disclosure, a computer-readable storage medium can be any tangible medium containing or storing a program that can be used by or in conjunction with an instruction execution system, device, or device. In this disclosure, a computer-readable signal medium can include a data signal propagated in a baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, devices, or devices. The program code contained on the computer-readable medium can be transmitted using any suitable medium, including but not limited to: wires, optical cables, RF (radio frequency), etc., or any suitable combination thereof.

In some embodiments, the client and server may communicate using any currently known or future developed network protocol such as HTTP (Hyper Text Transfer Protocol), and may be interconnected with any form or medium of digital data communication (e.g., a communication network). Examples of communication networks include local area networks ("LANs"), wide area networks ("WANs"), the Internet (e.g., the Internet), and end-to-end networks (e.g., ad hoc end-to-end networks), as well as any currently known or future developed networks.

The computer-readable medium can be included in the electronic device, or it can exist alone without being assembled into the electronic device.

The computer-readable medium carries one or more programs, and when the one or more programs are executed by the electronic device, the electronic device: obtains at least two animal figure images and at least two sets of figure feature information corresponding to the animal figure based on the animal figure generation model; fuses the at least two sets of figure feature information to obtain mixed figure feature information; inputs predetermined attribute information into a predetermined coder to obtain an attribute code; inputs the mixed figure feature information and attribute code into the animal figure generation model to obtain a target animal figure and target figure feature information.

Computer program code for performing the operations of the present disclosure may be written in one or more programming languages, or combinations thereof, including but not limited to Object Oriented programming languages such as Java, Smalltalk, C++, and also including conventional procedural programming languages such as "C" language or similar programming languages. The program code may be executed entirely on the user's computer, partially on the user's computer, as a standalone software package, partially on the user's computer, or entirely on a remote computer or server. In the case of a remote computer, the remote computer may be connected to the user's computer through any type of network, including a local area network (LAN) or a wide area network (WAN), or may be connected to an external computer (e.g., using an Internet service provider to connect via the Internet).

The flowcharts and block diagrams in the accompanying drawings illustrate the architecture, functions, and operations of systems, methods, and computer program products that may be implemented in accordance with various embodiments of the present disclosure. in this regard, each block in the flowchart or block diagram may represent a module, program segment, or portion of code that contains one or more executable instructions for implementing a specified logical function. It should also be noted that in some alternative implementations, the functions indicated in the blocks may also occur in a different order than those indicated in the figures. For example, two blocks represented in succession may actually be executed substantially in parallel, and they may sometimes be executed in reverse order, depending on the function involved. It should also be noted that each block in the block diagram and/or flowchart, and combinations of blocks in the block diagram and/or flowchart, may be implemented using a dedicated hardware-based system that performs the specified function or operation, or may be implemented using a combination of dedicated hardware and computer instructions.

Described in embodiments of the present disclosure relates to a unit may be implemented by way of software, may be implemented by way of hardware, wherein the name of the unit does not constitute a limitation on the unit itself in some cases.

The functions described above herein may be performed at least in part by one or more hardware logic components. For example, without limitation, example types of hardware logic components that may be used include field programmable gate arrays (FPGAs), application specific integrated circuits (ASICs), application specific standard products (ASSPs), system-on-chip (SOCs), complex programmable logic devices (CPLDs), and the like.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. More specific examples of machine-readable storage media may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, embodiments of the present disclosure disclose a method of generating an animal figure, comprising: obtaining, based on an animal figure generation model, at least two animal figure images and at least two sets of figure feature information respectively corresponding to the at least two animal figure images; integrating the at least two sets of figure feature information to obtain mixed figure feature information; inputting predetermined attribute information into a predetermined coder to obtain an attribute code; and inputting the mixed figure feature information and the attribute code into the animal figure generation model to obtain a target animal figure image and target figure feature information.

For example, obtaining, based on an animal figure generation model, at least two animal figure images and at least two sets of figure feature information respectively corresponding to the at least two animal figure images comprises: inputting random feature code or figure feature information output by the animal figure generation model into the animal figure generation model to obtain the at least two animal figure images and at least two sets of figure feature information respectively corresponding to the at least two animal figure images.

For example, integrating the at least two sets of figure feature information to obtain mixed figure feature information comprises: performing a weighted summation operation of the at least two sets of figure feature information according to predetermined weights to obtain the mixed figure feature information.

For example, the animal figure generation model is trained by applying a crossed iterative training on a generation model and a discriminant model until an accuracy of a discriminant result output by the discriminant model meets a predetermined condition, the trained generation model determined as the animal figure generation model.

The crossed iterative training comprises: inputting first random noise data into the generation model to obtain first animal figure data; inputting the first animal figure data and first animal figure sample data into the discriminant model to obtain a first discriminant result; adjusting a parameter of the generation model based on the first discrimination result; inputting second random noise data into the adjusted generation model to obtain second animal figure data; inputting the second animal figure data and second animal figure sample into the discriminant model to obtain a second discriminant result, and determining a real discriminant result between the second animal figure data and the second animal figure sample; and adjusting the parameter in the discriminant model according to a loss function of the second discriminant result and the real discriminant result.

For example, the predetermined coder is trained by inputting real attribute information into an initial coder to obtain an initial attribute code; inputting the initial attribute code and predetermined animal figure feature information into the animal figure generation model to obtain a trained animal figure image; determining coded attribute information based on the trained animal figure image; training the initial coder according to a loss function of the real attribute information and the coded attribute information to obtain a trained coder as the predetermined coder.

For example, the determining coded attribute information based on the trained animal figure image comprises inputting the trained animal figure image into a predetermined attribute recognition model to obtain the coded attribute information.

For example, the attribute information comprises at least one of age, hair color, figure angle, or breed.

What is claimed is:

1. A method of generating an animal figure, comprising:

obtaining, based on an animal figure generation model, at least two animal figure images and at least two sets of figure feature information respectively corresponding to the at least two animal figure images;

integrating the at least two sets of figure feature information to obtain mixed figure feature information;

inputting predetermined attribute information into a predetermined coder to obtain an attribute code; and inputting the mixed figure feature information and the attribute code into the animal figure generation model to obtain a first animal figure image and first figure feature information.

2. The method of claim 1, wherein obtaining, based on an animal figure generation model, at least two animal figure images and at least two sets of figure feature information respectively corresponding to the at least two animal figure images comprises:

inputting a random feature code or figure feature information output by the animal figure generation model into the animal figure generation model to obtain the at least two animal figure images and at least two sets of figure feature information respectively corresponding to the at least two animal figure images.

3. The method of claim 1, wherein integrating the at least two sets of figure feature information to obtain mixed figure feature information comprises:

performing a weighted summation operation of the at least two sets of figure feature information according to predetermined weights to obtain the mixed figure feature information.

4. The method of claim 1, wherein the animal figure generation model is trained by:

applying a crossed iterative training on a generation model and a discriminant model until an accuracy of a discriminant result output by the discriminant model meets a predetermined condition, the trained generation model determined as the animal figure generation model, wherein the crossed iterative training comprises:

inputting first random noise data into the generation model to obtain first animal figure data;

inputting the first animal figure data and first animal figure sample data into the discriminant model to obtain a first discriminant result;

adjusting a parameter of the generation model based on the first discrimination result;

inputting second random noise data into the adjusted generation model to obtain second animal figure data;

inputting the second animal figure data and second animal figure sample into the discriminant model to obtain a second discriminant result, and determining a real discriminant result between the second animal figure data and the second animal figure sample; and adjusting the parameter in the discriminant model according to a loss function of the second discriminant result and the real discriminant result.

5. The method of claim 1, wherein the predetermined coder is trained by:

inputting real attribute information into an initial coder to obtain an initial attribute code;

inputting the initial attribute code and predetermined animal figure feature information into the animal figure generation model to obtain a trained animal figure image;

determining coded attribute information based on the trained animal figure image;

training the initial coder according to a loss function of the real attribute information and the coded attribute information to obtain a trained coder as the predetermined coder.

6. The method of claim 5, wherein the determining coded attribute information based on the trained animal figure image comprises:

inputting the trained animal figure image into a predetermined attribute recognition model to obtain the coded attribute information.

7. The method of claim 1, wherein the attribute information comprises at least one of: age, hair color, figure angle, or breed.

8. An electronic device comprising:

one or more processing devices; and a storage configured to store one or more programs;

the one or more programs, when executed by the one or more processing devices, causing the one or more processing devices to perform acts comprising:

obtaining, based on an animal figure generation model, at least two animal figure images and at least two sets of figure feature information respectively corresponding to the at least two animal figure images;

integrating the at least two sets of figure feature information to obtain mixed figure feature information;

inputting predetermined attribute information into a predetermined coder to obtain an attribute code; and inputting the mixed figure feature information and the attribute code into the animal figure generation model to obtain a first animal figure image and first figure feature information.

9. The electronic device of claim 8, wherein obtaining, based on an animal figure generation model, at least two animal figure images and at least two sets of figure feature information respectively corresponding to the at least two animal figure images comprises:

inputting a random feature code or figure feature information output by the animal figure generation model into the animal figure generation model to obtain the at least two animal figure images and at least two sets of figure feature information respectively corresponding to the at least two animal figure images.

10. The electronic device of claim 8, wherein integrating the at least two sets of figure feature information to obtain mixed figure feature information comprises:

performing a weighted summation operation of the at least two sets of figure feature information according to predetermined weights to obtain the mixed figure feature information.

11. The electronic device of claim 8, wherein the animal figure generation model is trained by:

applying a crossed iterative training on a generation model and a discriminant model until an accuracy of a discriminant result output by the discriminant model meets a predetermined condition, the trained generation model determined as the animal figure generation model, wherein the crossed iterative training comprises:

inputting first random noise data into the generation model to obtain first animal figure data;

inputting the first animal figure data and first animal figure sample data into the discriminant model to obtain a first discriminant result;

adjusting a parameter of the generation model based on the first discrimination result;

inputting second random noise data into the adjusted generation model to obtain second animal figure data;

inputting the second animal figure data and second animal figure sample into the discriminant model to obtain a second discriminant result, and determining a real discriminant result between the second animal figure data and the second animal figure sample; and adjusting the parameter in the discriminant model according to a loss function of the second discriminant result and the real discriminant result.

12. The electronic device of claim 8, wherein the predetermined coder is trained by:

inputting real attribute information into an initial coder to obtain an initial attribute code;

inputting the initial attribute code and predetermined animal figure feature information into the animal figure generation model to obtain a trained animal figure image;

determining coded attribute information based on the trained animal figure image;

training the initial coder according to a loss function of the real attribute information and the coded attribute information to obtain a trained coder as the predetermined coder.

13. The electronic device of claim 12, wherein the determining coded attribute information based on the trained animal figure image comprises:

inputting the trained animal figure image into a predetermined attribute recognition model to obtain the coded attribute information.

14. The electronic device of claim 8, wherein the attribute information comprises at least one of: age, hair color, figure angle, or breed.

15. A non-transitory computer-readable medium having a computer program stored thereon, the computer program, when executed by a processing device, implementing a method for generating an animal figure comprising:

obtaining, based on an animal figure generation model, at least two animal figure images and at least two sets of figure feature information respectively corresponding to the at least two animal figure images;

integrating the at least two sets of figure feature information to obtain mixed figure feature information;

inputting predetermined attribute information into a predetermined coder to obtain an attribute code; and inputting the mixed figure feature information and the attribute code into the animal figure generation model to obtain a first animal figure image and first figure feature information.

16. The computer-readable medium of claim 15, wherein obtaining, based on an animal figure generation model, at least two animal figure images and at least two sets of figure feature information respectively corresponding to the at least two animal figure images comprises:

inputting a random feature code or figure feature information output by the animal figure generation model into the animal figure generation model to obtain the at least two animal figure images and at least two sets of figure feature information respectively corresponding to the at least two animal figure images.

17. The computer-readable medium of claim 15, wherein integrating the at least two sets of figure feature information to obtain mixed figure feature information comprises:

performing a weighted summation operation of the at least two sets of figure feature information according to predetermined weights to obtain the mixed figure feature information.

18. The computer-readable medium of claim 15, wherein the animal figure generation model is trained by:

applying a crossed iterative training on a generation model and a discriminant model until an accuracy of a discriminant result output by the discriminant model meets a predetermined condition, the trained generation model determined as the animal figure generation model, wherein the crossed iterative training comprises:

inputting first random noise data into the generation model to obtain first animal figure data;

inputting the first animal figure data and first animal figure sample data into the discriminant model to obtain a first discriminant result;

adjusting a parameter of the generation model based on the first discrimination result;

inputting second random noise data into the adjusted generation model to obtain second animal figure data;

inputting the second animal figure data and second animal figure sample into the discriminant model to obtain a second discriminant result, and determining a real discriminant result between the second animal figure data and the second animal figure sample; and adjusting the parameter in the discriminant model according to a loss function of the second discriminant result and the real discriminant result.

19. The computer-readable medium of claim 15, wherein the predetermined coder is trained by:

inputting real attribute information into an initial coder to obtain an initial attribute code;

inputting the initial attribute code and predetermined animal figure feature information into the animal figure generation model to obtain a trained animal figure image;

determining coded attribute information based on the trained animal figure image;

training the initial coder according to a loss function of the real attribute information and the coded attribute information to obtain a trained coder as the predetermined coder.

20. The computer-readable medium of claim 15, wherein the determining coded attribute information based on the trained animal figure image comprises:

inputting the trained animal figure image into a predetermined attribute recognition model to obtain the coded attribute information.

* * * * *